United States Patent
Wynn

[11] 4,087,126
[45] May 2, 1978

[54] CONSOLE FOR VAN-TYPE VEHICLES

[75] Inventor: Larry R. Wynn, New Brighton, Pa.

[73] Assignee: Luce Industries, Inc., Ashtabula, Ohio

[21] Appl. No.: 741,678

[22] Filed: Nov. 15, 1976

[51] Int. Cl.² .............................................. B60R 7/04
[52] U.S. Cl. .................................... 296/37.8; 108/44; 224/42.42
[58] Field of Search .................. 296/37.8, 37.6, 37.12, 296/37.14, 37.15, 37.1, 1 R; 180/89.11; 224/42.42 R, 29 G, 29 H; 108/45, 44

[56] References Cited

U.S. PATENT DOCUMENTS

| | | | |
|---|---|---|---|
| 1,556,353 | 10/1925 | Roedding | 296/37.8 |
| 2,091,059 | 8/1937 | Tjaarda | 296/37.12 |
| 3,163,287 | 12/1964 | Barnett | 224/42.42 R |
| 3,650,444 | 3/1972 | Gibson | 224/42.42 R |
| 3,807,788 | 4/1974 | Radek | 296/1 R |

FOREIGN PATENT DOCUMENTS 965,649  8/1964  United Kingdom .............. 296/37.12

*Primary Examiner*—Joseph F. Peters, Jr.
*Assistant Examiner*—John A. Pekar
*Attorney, Agent, or Firm*—Meyer, Tilberry & Body

[57] ABSTRACT

A console is provided to approximate the contour of the shroud over the portion of an automobile engine extending rearwardly into the cab of a van-type truck. The console provides convenience accessories, such as liquid container holders, trash bins, and ashtrays and a safe compartment in which electronic devices, such as radios and tape players, may be stored and locked.

1 Claim, 5 Drawing Figures

CONSOLE FOR VAN-TYPE VEHICLES

This invention pertains to improvements in automobiles, and, in particular, improvements in van-type trucks. The commercial van-type truck has been available to the public for many years for business purposes. Recently, however, it has become popular to customize vans and to convert them for personal and recreational use. This invention relates to means to customize a van rendering it more convenient and enjoyable for business as well as recreational purposes. In particular, with vans of the type wherein the engine is mounted over the front wheels, a considerable portion of the engine necessarily must extend rearwardly into the cab portion of the van, wherein it is shrouded to seal off the engine from the interior of the cab. However, with this intrusion into cab space, the space under the traditional dashboard of the vehicle for utilitarian purposes is severely limited. Thus, on the driver's side there is only sufficient space to provide for the vehicle controls. On the passenger side there is usually only sufficient space for the passenger's feet. Accordingly, certain conveniences which have been provided with passenger vehicles are not provided by the manufacturer of vans and it is the purpose of this invention to remedy this deficiency. The subject invention is a console, the underside of which is adapted to approximate the contour of the engine shroud of a specific make and model of van. With the console mounted on the engine shroud, various attachments and conveniences may be provided in conjunction with the console such as liquid container holders, ashtrays, trash bins, article retaining trays, and a compartment in which an AM-FM radio, a C.B. radio, or any other electronic device such as a tape player may be mounted and locked to minimize theft potential.

It is therefore a primary object of this invention to provide a convenience and security console for use in customizing a van-type truck.

It is another object of this invention to provide a convenience and security console which is attractively finished and which will render the van more suitable aestheticwise for pleasure purposes.

It is yet another object of this invention to provide a convenience and security console which provides storage and concealment of electronic accessories, such as AM-FM radios, C.B. radios, and tape players.

It is still another object of this invention to provide a convenience and security console in which various objects may be safely and securely placed within the driver's reach so that access may be had to them without requiring that the driver's attention is distracted while the vehicle is in motion.

With the foregoing and other objects and features of the invention which will become evident from a reading of this specification, the invention consists of certain novel features of design and arrangement as illustrated in the accompanying drawings and, particularly, pointed out in the appended claims, it being understood that various changes in the form, proportion, size and minor details of the invention may be made without departing from the spirit, or sacrificing any of the advantages, of the invention.

For the purpose of facilitating an understanding of my invention, I have illustrated in the accompanying drawings preferred embodiments thereof, from an inspection of which when considered in connection with the following description, my invention, its mode of construction, assembly and application and many of its advantages, will be readily understood.

Reference is now made to the drawings in which the same characters of reference are employed to indicate corresponding or similar parts throughout the several Figures of the drawings, in which.

Figure 1:
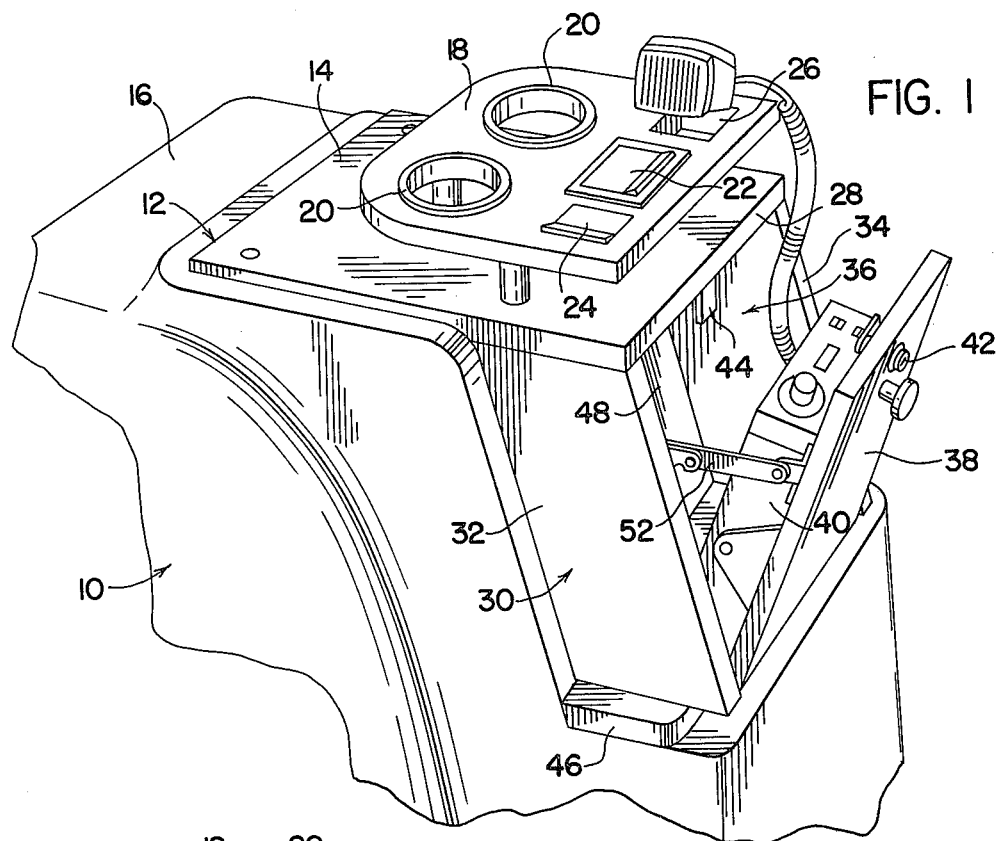
FIG. 1 is a perspective view of a preferred embodiment of the invention shown mounted on a 1976 Chevy-GMC van engine shroud.
Figure 2:
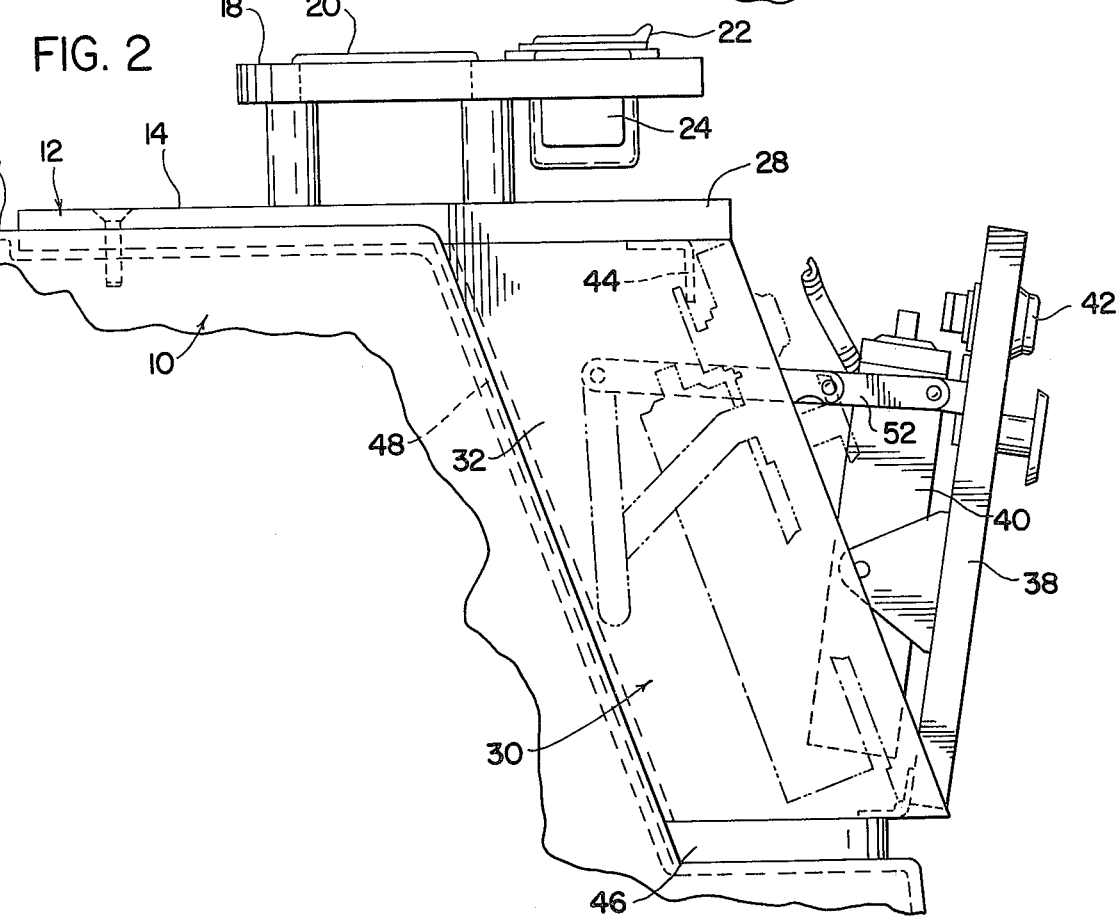
FIG. 2 is a side elevational view with parts in phantom of the invention of FIG. 1, showing the security compartment, for housing equipment, in both the open and closed positions.
Figure 3:
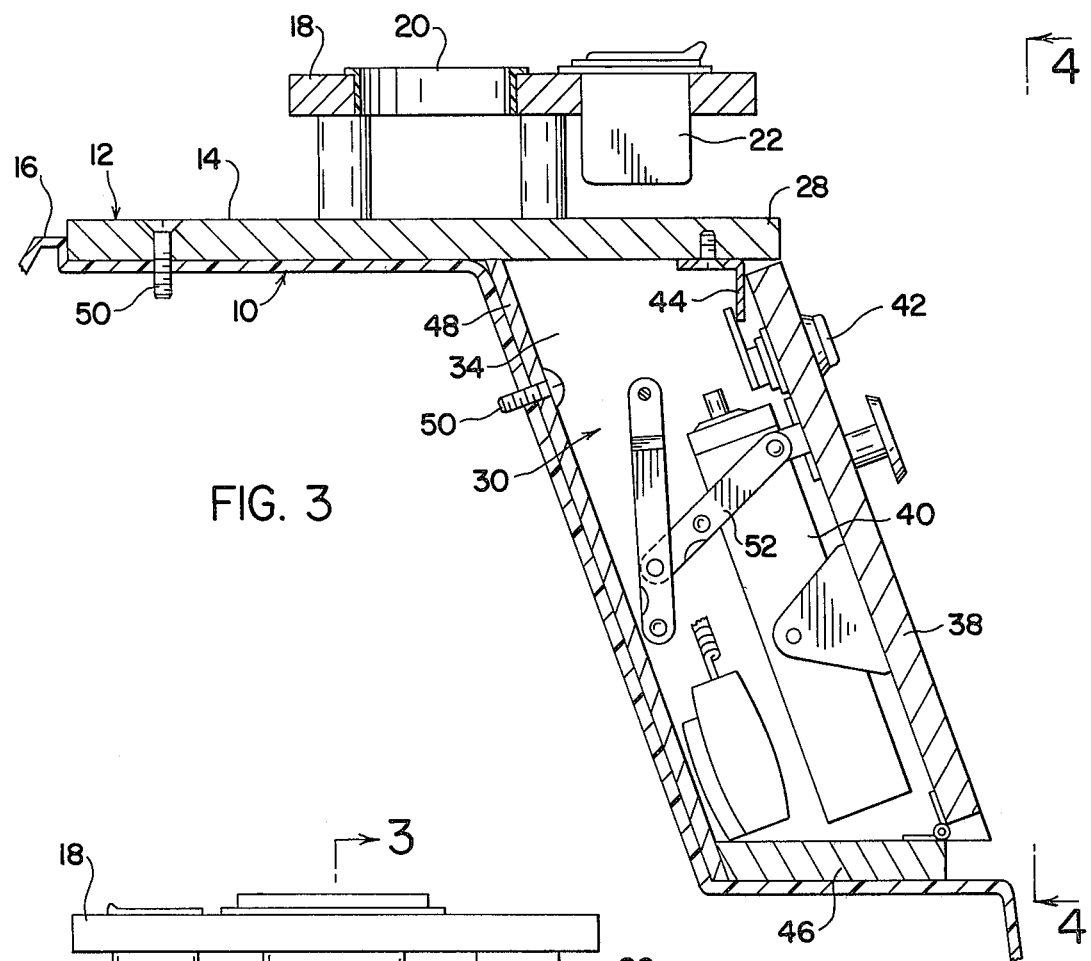
FIG. 3 is a side elevational view in section of the invention shown in FIG. 1, showing the security compartment of the console, for housing equipment, in the closed position.
Figure 4:
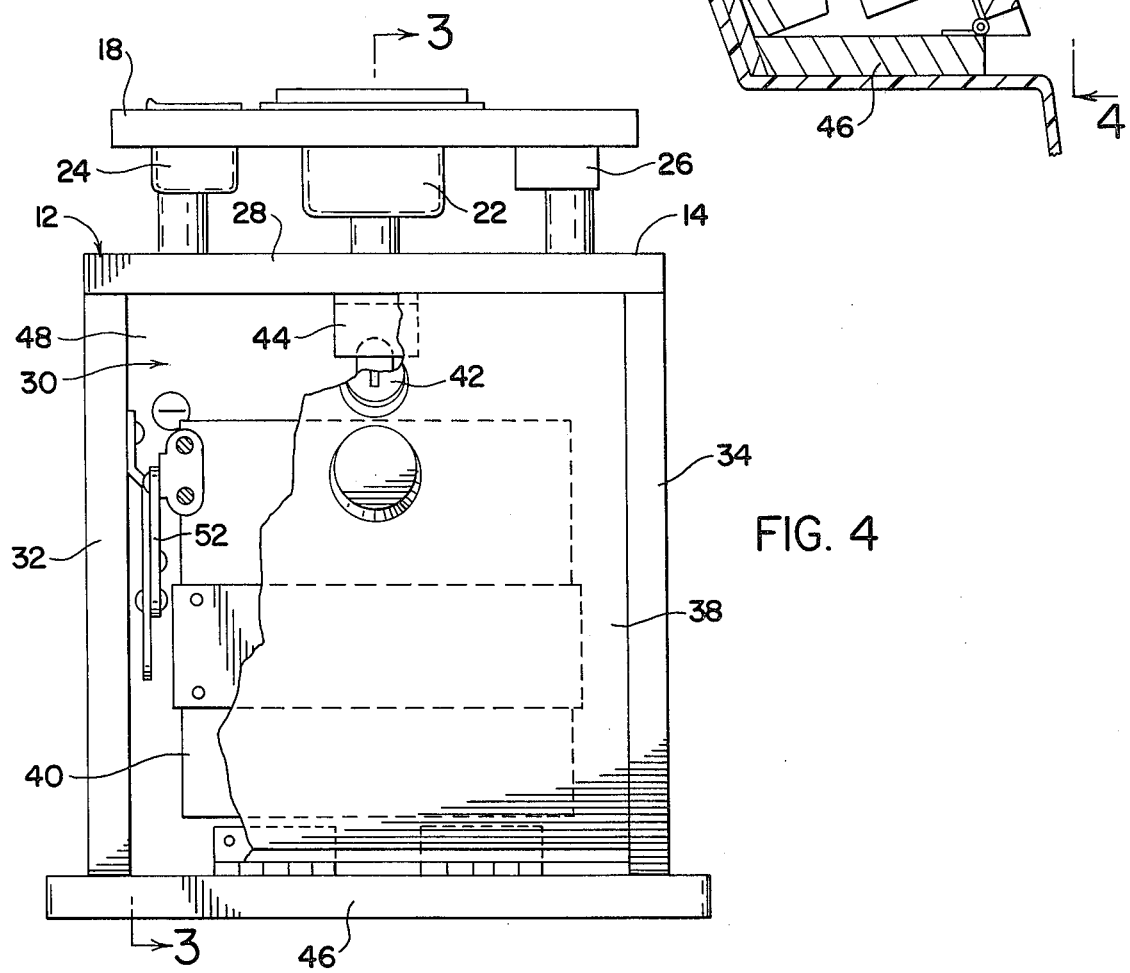
FIG. 4 is a fragmentary front elevational view of a preferred embodiment of the invention taken along the line 4—4 of FIG. 3; and, FIG. 5 is a perspective view of yet another preferred embodiment of the invention shown mounted on a 1976 Ford van engine shroud.

Referring now to the drawings in greater detail, and FIGS. 1-4 in particular, a shroud 10 of a Chevy-GMC 1976 van is shown to which is fastened a convenience-security console 12. The console comprises a base platform 14 which is adapted to be secured to the upper surface 16 of shroud 10. A convenience receptacle platform 18 is spaced above and secured to base platform 14, and is provided with apertures for various convenience accessories, such as liquid container holders 20, a trash bin 22, an ashtray 24, and miscellaneous container tray 26 to hold loose change, pencils, and the like. Base platform 14 projects rearwardly beyond shroud 10, and secured to the underside of this rearwardly extending portion 28 is a compartment 30 comprising a pair of side panels 32 and 34, to frame a hatch opening 36. A hatch cover 38 is pivotally secured between the lower portions of side panels 32 and 34 so as to permit the hatch cover 38 to close between side panels 32 and 34 to form an entirely enclosed compartment. An electronic device, such as a C.B. radio 40 may be secured to the inside face of hatch cover 38. A lock 42 is provided on the upper portion of hatch cover 38 to make locking engagement with a mating part 44, secured to the underside of base platform projection 28, so that the electronic device may be secured in the compartment 30 out of sight from potential thieves.

It is to be understood that the exact configuration and proportions of base platform 14, and side panels 32 and 34 will vary from manufacturer to manufacturer and from model to model of van-type trucks. It is therefore contemplated that minor modifications will be made from console to console to accommodate different contours of engine shrouds. It is also contemplated that a base panel 46 may be provided to span side panels 32 and 34, and a back panel 48 may also be provided for additional security as well as to provide additional mounting facilities for other accessories and equipment. The console 12 is secured to the shroud 10 with machine screws or the like 50, best shown in FIG. 3. Hinge means 52 are provided to delimit the outward pivotal movement of the hatch 38.

Figure 5:
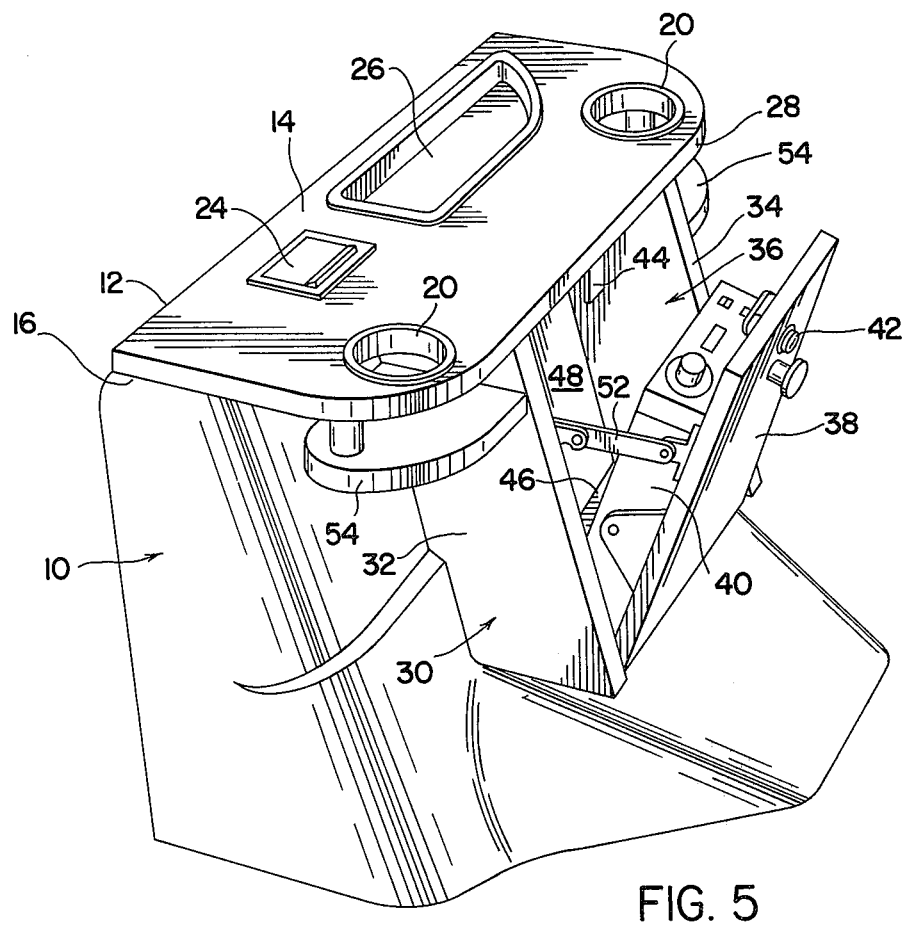

Reference is now made to FIG. 5, wherein is shown another preferred embodiment of the invention modified for adaptation to a 1976 Ford van. In this embodiment, in lieu of a platform 18 spaced above base platform 14, as shown in FIGS. 1-4, a pair of shelves 54 subtend base platform 14 to support containers placed in container holders 20. Otherwise, this embodiment is essentially the same as the embodiment shown in FIGS. 1-4, wherein the same characters of reference are employed to indicate corresponding or similar parts.

While particular embodiments of the present invention have been shown and described, it will be obvious to those skilled in the art that changes and modifications may be made without departing from this invention in its broader aspects and, therefore, the aim of the appended claims is to cover all such changes and modifications as fall within the true spirit and scope of this invention.

What is claimed is:

1. In an automobile van with an engine shroud extending rearwardly into the interior of said van, said shroud having a substantially horizontal upper surface and an inclined substantially vertical rear surface, a security and convenience console comprising: a first platform having a base portion adapted to rest on top of the upper surface of said shroud and a cantilever portion projecting rearwardly from said base portion; means to rigidly secure said base portion to said upper surface of said shroud; a second platform spaced above and secured parallel to said first platform by a plurality of support posts positioned substantially vertically between said first and second platforms and integrally secured therebetween; convenience receptacles in said second platform including at least one liquid container holder and at least one article container tray; a security compartment adapted to abut against said rear surface of said shroud and rigidly fastened to the under surface of said cantilever portion of said first platform and extending downwardly therefrom; hatch means to provide access into said compartment; a hatch cover pivotally secured at its lower edge to the lower edge of said hatch to permit said hatch cover to open and close said hatch; stop means to delimit the outward pivotal movement of said hatch cover; and means to lock said hatch cover to said compartment.

* * * * *